United States Patent [19]

Inukai

[11] 4,372,501

[45] Feb. 8, 1983

[54] SEATBELT RETRACTOR

[75] Inventor: Mitsuo Inukai, Aichi, Japan

[73] Assignee: Toyota Jidosha Kogyo Kabushiki Kaisha, Aichi, Japan

[21] Appl. No.: 224,699

[22] Filed: Jan. 13, 1981

[30] Foreign Application Priority Data

Jan. 16, 1980 [JP] Japan ................. 55-3153[U]

[51] Int. Cl.³ ............... A62B 35/02; B05H 75/48
[52] U.S. Cl. ................. 242/107; 242/107.4 A; 280/806
[58] Field of Search .......... 242/107, 107.4 R–107.4 E; 280/806; 297/477, 478, 480; 244/122 B

[56] References Cited

U.S. PATENT DOCUMENTS

| | | | |
|---|---|---|---|
| 3,178,136 | 4/1965 | Bayer | 242/107.4 B X |
| 3,178,225 | 4/1965 | Bayer | 242/107.4 B |
| 3,211,175 | 10/1965 | Replogle | 141/18 X |
| 3,531,061 | 9/1970 | Davies | 242/107.4 B |
| 3,917,031 | 11/1975 | Doin et al. | 280/806 X |
| 3,918,545 | 11/1975 | Andres et al. | 244/122 B |
| 4,056,242 | 11/1977 | Herrmann | 242/107.4 R |
| 4,286,758 | 9/1981 | Inukai et al. | 242/107.4 R X |

Primary Examiner—John M. Jillions
Attorney, Agent, or Firm—Stevens, Davis, Miller & Mosher

[57] ABSTRACT

A seatbelt retractor forcibly winds up a webbing fastened to an occupant onto a takeup shaft by utilization of an explosive force of a powder to closely attach the webbing to the occupant for restraining and protecting the occupant in an emergency of a vehicle. The retractor is provided therein with a pressure control valve for releasing an explosive pressure exceeding a predetermined value to atmosphere, which prevents a webbing takeup force beyond necessity from acting on the takeup shaft so as not to permit the webbing to excessively oppress the occupant.

8 Claims, 8 Drawing Figures

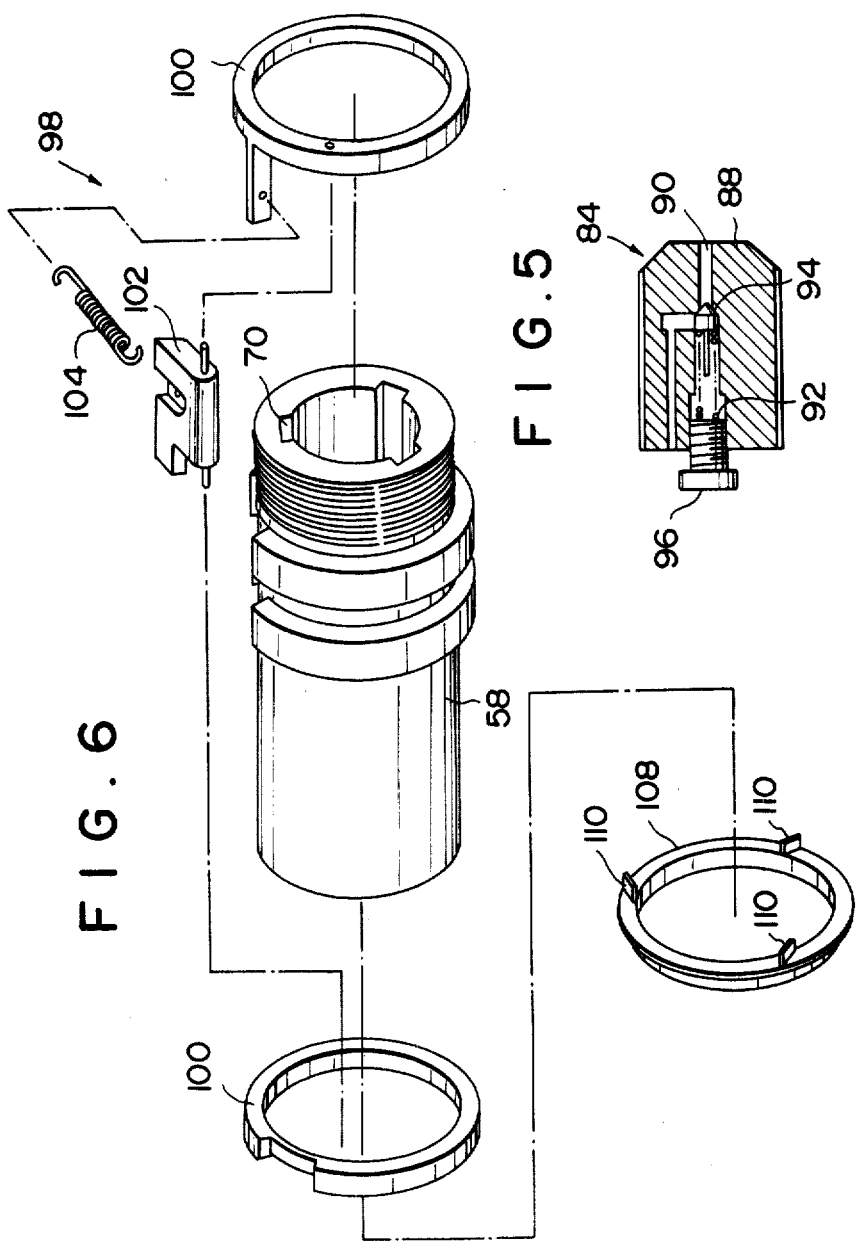

SEATBELT RETRACTOR

BACKGROUND OF THE INVENTION

1. Field of the Invention

The present invention relates to a seatbelt retractor for winding up an occupant restraining webbing used in a seatbelt system for protecting an occupant in a vehicle during emergency conditions, and particularly to a seatbelt retractor adapted to forcibly wind up the webbing to closely attach the same to the occupant during an emergency.

2. Description of the Prior Art

Since slack is formed between the webbing fastened to the occupant and the body of occupant during normal running condition of the vehicle, there is a possibility of imperfect restraining of the occupant occurring during an emergency until the occupant is moved because of the collision under an inertial force to eliminate the slack.

For the abovedescribed reason, there has been proposed a preloader mechanism in which, in an emergency of the vehicle, an explosive force of a powder is imparted to a takeup shaft to be rotated, whereby the webbing is rapidly wound up by the takeup shaft so that the webbing can be closely attached to the occupant, thereby improving the restraining performance of the webbing.

However, with this type of the preloader mechanism, the explosive force of the powder is high, and hence, the force acts on the occupant through the webbing as an oppressive force. As the result, the occupant, who has been violently moved in the direction of collision, is abruptly subjected to a restraining force in a reverse direction, thus possibly causing damage to the occupant.

SUMMARY OF THE INVENTION

The present invention has been developed to obviate the abovedescribed disadvantages and has as its object the provision of a seatbelt retractor, in which, even if the preloader mechanism utilizing the powder is utilized, the webbing is not excessively violently wound up during a vehicular emergency, so that the webbing can be wound up under an adequate pressure to eliminate the slack which has been formed between the webbing and the occupant.

The seatbelt retractor according to the present invention is provided with a pressure control valve, which can restrict the explosive force of the powder to a predetermined value so as to regulate the takeup force applied to the webbing.

Description will hereunder be given of an embodiment of the present invention with reference to the drawings.

BRIEF DESCRIPTION OF THE DRAWINGS

FIG. 5 is a sectional view showing the pressure control view;

FIG. 6 is a disassembled perspective view showing the clutch mechanism;

DESCRIPTION OF THE PREFERRED EMBODIMENT

Figure 1:
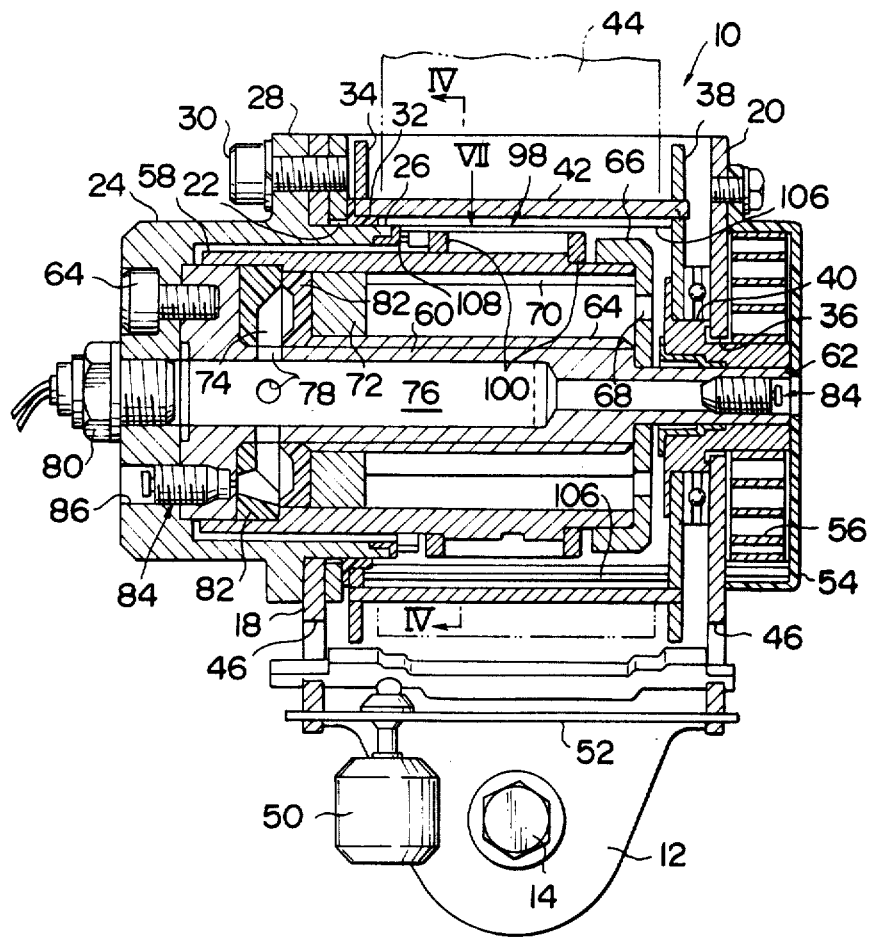
FIG. 1 is a sectional view showing a first embodiment of the seatbelt retractor according to the present invention.
Figure 7:
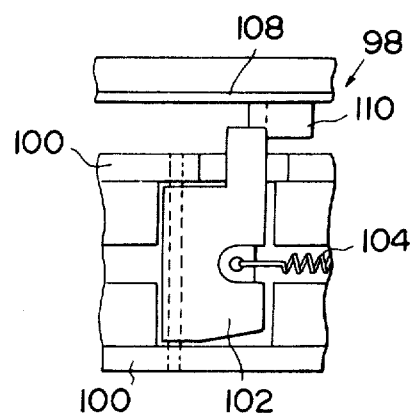
FIG. 7 is a view in the direction indicated by the arrows from the line VII in FIG. 1.
Figure 2:
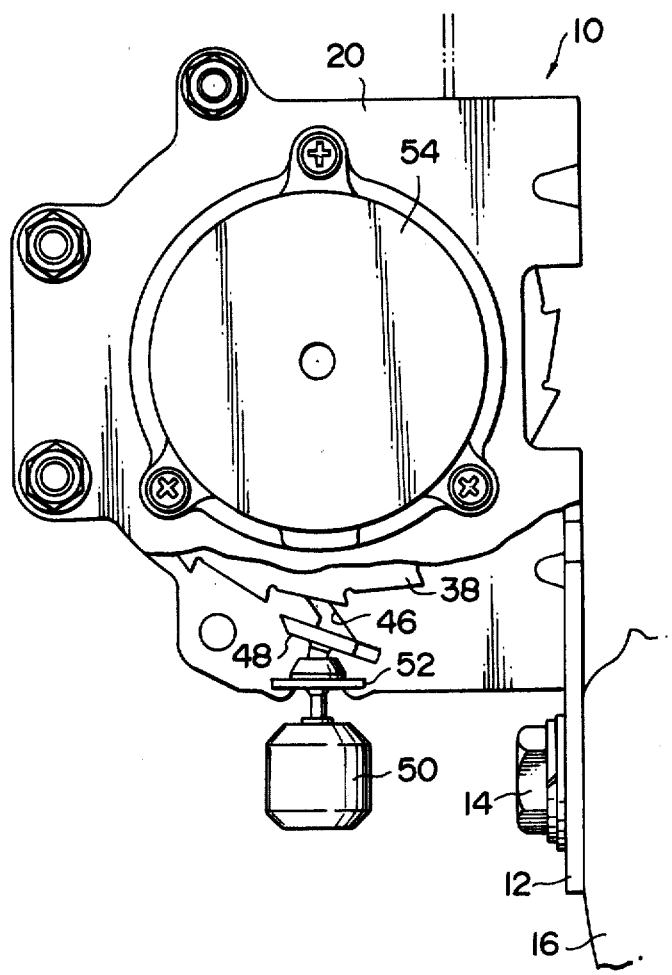
FIG. 2 is a right side view of FIG. 1.
Figure 3:
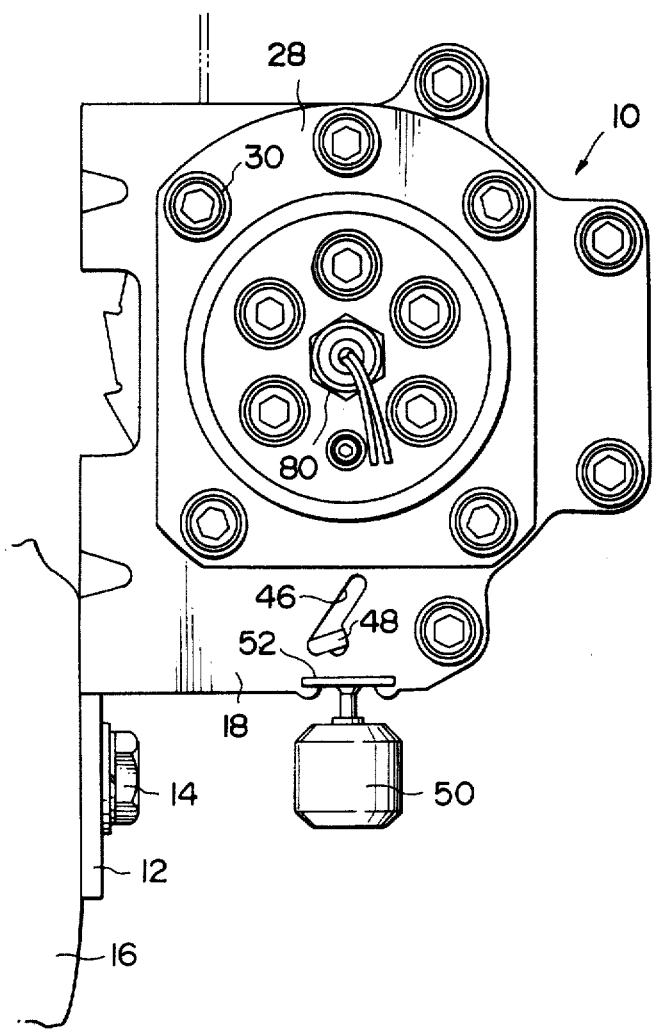
FIG. 3 is a left side view of FIG. 1.

Referring to FIGS. 1 through 3, a seatbelt retractor 10 is mounted on a suitable position of a vehicle 16 through a mounting hole penetrated in a plate-like frame 12, the mounting hole being applied with a bolt 14. Opposite sides of the plate-like frame 12 are bent at a right angle, respectively, and then formed into legs 18, 20 extending in parallel with each other.

As shown in FIG. 1, the leg 18 is penetrated therethrough with a round hole 22, through which is inserted a protruded cylindrical portion 26 of a cover 24. This cover 24 is clampedly secured to the leg 18 with a flange portion 28 radially extending from the base portion of the protruded cylindrical portion 26 thereof having a plurality of mounting bolts 30 applied therethrough.

A disk 34 pivotally supported by a bearing hole penetrated at the center of the protruded cylindrical portion 26 of this cover 24 through a bush 32. A ratchet wheel is notchingly provided on the outer periphery of this disk 34.

On the other hand, a disk 38, on the outer periphery of which is notchingly provided a ratchet wheel identical in shape with the one on the disk 34, is pivotally supported through a boss portion 40 by a round hole 36 formed in the leg 20 coaxially with the round hole 22 of the leg 18. These disks 34, 38 are secured to opposite ends of a cylindrical winding drum 42. Both disks 34, 38 constitute a takeup shaft for the occupant restraining webbing 44 and house a preloader mechanism therebetween.

The legs 18, 20 are respectively penetrated therethrough with slots 46, across which opposite ends of a pawl 48 are journalled. This pawl 48 is relatively opposed to the ratchet wheels on the disks 34 and 38, and is separated from the ratchet wheels by gravity during normal running condition of the vehicle. However, during a vehicular emergency, the pawl is pushed up by a pendulum 50 to be brought into meshing engagement with the ratchet wheels, to thereby stop the windout rotations of the disks 34, 38 and winding drum 42. The pendulum 50 is suspended from a bracket 52 racked across the legs 18 and 20.

A tongue plate, not shown, is secured to one end of a webbing 44, the other end of which is wound into the winding drum 42, and one end of this tongue plate is engaged with a buckle device secured to the vehicle body, so that the intermediate portion of the webbing can be fastened to the occupant.

A spring casing 54 is secured to the outer surface of the leg 20, and a spiral spring 56 is confined between the leg 20 and the spring casing 54, whereby the winding drum 42 is biased in the direction of winding the webbing 44 up.

The central portion of the cover 24 is bulged out to a considerable extent in the direction of being separated from the leg 18 and provided therein with a columnar hollow portion. A drum 58 and a drum support shaft 60 are housed in the hollow portion of the winding drum 42.

One end of this drum support shaft 60 is formed into a small diameter portion 62, which penetrates through the boss portion 40 pivotally supported by the round hole 36 of the leg 20 and pivotally supported by the boss portion 40 through a bush. Further, threads having a large pitch are provided on the intermediate portion of the drum support shaft 60, the other end of which is solidly secured to the cover 24 through a plurality of screws 64.

The drum 58 is cylindrical in form, directly pivotally supported at one end by the large diameter portion of the drum support shaft 60 and also pivotally supported at the other end thereof by the drum support shaft 60 through a closure member 66. The closure member 66 is threadably coupled to the drum 58 and penetrated at a portion thereof with a through-hole 68.

Figure 4:
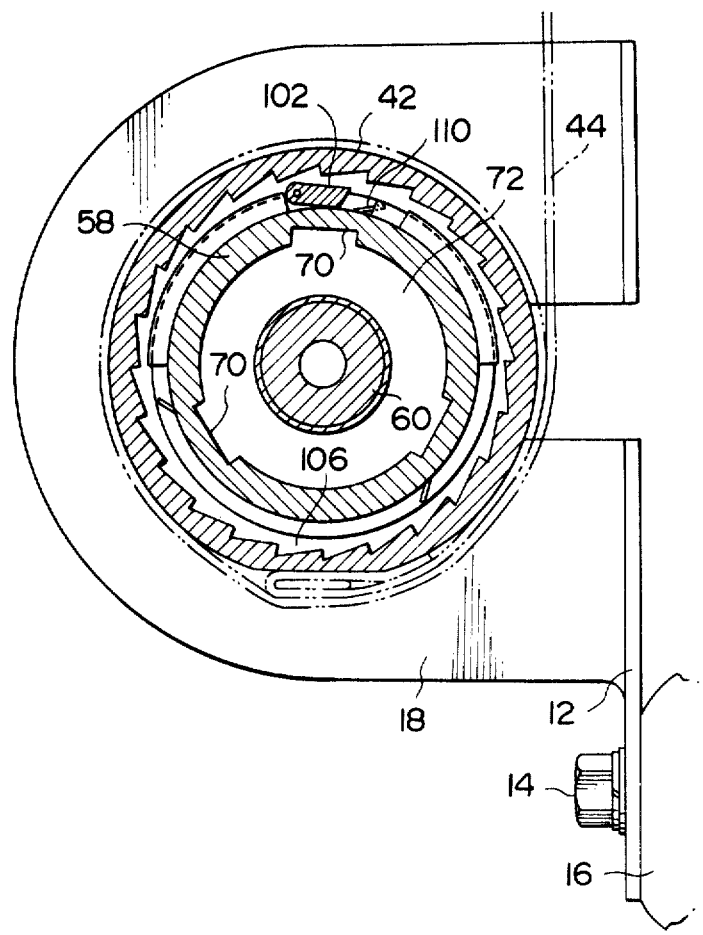
FIG. 4 is a sectional view taken along the line IV—IV in FIG. 1.

As shown in FIG. 4, this drum 58 is penetrated on the inner peripheral surface thereof with three grooves 70 in the axial direction thereof, and three projections formed on the outer peripheral surface of a piston 72 are received in these grooves 70, so that the piston 72 can be rotated in unison with the drum 58. The piston 72 is provided on the inner peripheral surface thereof with internal threads to be coupled to threads formed on the outer periphery of the drum support shaft 60.

A pressure chamber 74 is formed between the piston 72 and the large diameter portion of the drum support shaft 60, whereby the pressure imparted thereto from a powder chamber 76 penetratingly provided in the core portion of the drum support shaft 60 through a plurality of communicating holes 78 penetrated through the drum support shaft 60 in the radial direction thereof. One end of the powder chamber 76 is threadably coupled thereto with a powder unit 80 to close one end of the powder chamber 76, and the powder is sealed in this powder unit 80. This powder is adapted to receive a signal from a collision sensor, not shown, to be exploded, whereby a high pressure is generated in the powder chamber 76, so that this pressure can be fed to pressure chamber 74 through communicating holes 78. In the powder chamber 76, the surfaces of the piston 72 and the large diameter portion of the drum support shaft 60 are covered by a sealing material 82 to prevent the explosive pressure of the powder from leaking.

The powder chamber 76 in the drum support shaft 60 is threadably coupled at the end thereof on the side opposite to the powder unit 80 to a pressure control valve 84 to thereby close the other end of the powder chamber. A portion of the pressure chamber 74 is communicated with atmosphere through a vent hole 86 penetrated through the large diameter portion of the drum support shaft 60 and the protruded cylindrical portion 26 of the cover 24, and a pressure control valve 84 is threadably coupled into this vent hole 86 to prevent the pressure in the pressure chamber from accidentally leaking.

As shown in FIG. 5, a screw body of the pressure control valve 84 is penetratingly provided therethrough with a vent hole 90, and a valve body 94 pressed by a spring 92 is closely attached to the intermediate portion of this vent hole 90 to close the vent hole 90. When the pressure in the pressure chamber 74 and the powder chamber 76 exceeds a predetermined value, the valve body 94 moves against the pressure of the spring 92, so that the vent hole 90 can be opened, thereby maintaining the pressure in the pressure chamber 74 and the powder chamber 76 at the predetermined value. The spring 92 of this pressure control valve can be suitably adjusted by adjusting the screw-in value of an adjust screw 96.

A clutch mechanism 98 is provided between the outer periphery of the drum 58 and the inner periphery of the winding drum 42, and is adapted to connect the drum 58 to the winding drum 42 during an emergency. As shown in FIG. 6, in this clutch mechanism 98, a pawl 102 is pivotally supported by a pair of rings 100 coupled onto the outer periphery of the drum 58. This pawl 102 is separated from a ratchet wheel 106 notchingly provided on the inner periphery of the winding drum 42 by a biasing force of a tensile coil spring 104 during normal running condition of the vehicle, and, when the drum 58 rotates, comes into abutting contact with a swash plate cam 110 projected from a resin ring 108 fixed to the cover 24 to be pushed up against the biasing force of the tensile coil spring 104, thus coming into meshing engagement with the ratchet wheel 106.

In the embodiment of the present invention with the abovedescribed embodiment, the clutch mechanism 98 separates the drum 58 from the winding drum 42, whereby the winding drum 42 is freely rotatable, so that the occupant can wind the webbing out against the biasing force of the spiral spring 56, thereby enabling him to change his driving posture.

During a vehicular emergency such as a collision, the collision sensor, not shown, senses the emergency of the vehicle to send a signal to the powder unit 80, whereby the powder is exploded to generate a high pressure in the powder chamber 76. This high pressure is imparted to the pressure chamber 74 through the communicating holes 78, whereby the piston 72 rapidly moves toward the leg 20 while rotating along the threads of the drum support shaft 60. This turning force of the piston 72 rapidly rotates the drum 58 through the three grooves 70 in the direction of winding the webbing up, and the pawl 102 comes into abutting contact with the swash plate cam 110 during a first step of this rotation to turn against the biasing force of the tensile coil spring 104, to thereby engage the ratchet wheel 106 of the winding drum 42. By this, the winding drum 42 is connected to the drum 58 through the pawl 102 and rapidly rotates in the direction of winding the webbing up, to thereby wind the webbing 44 around the winding drum 42. Consequently, the webbing whose excessive remaining portion is wound around the winding drum is firmly attached to the occupant.

If the pawl 102 rotates while being in meshing contact with the ratchet wheel 106, the pawl 102 interferes with the swash plate cam 110, whereby this swash plate cam 110 made of resin is broken by the turning force of the pawl 102 and released from the ring 108. However, there should be no problem caused by this breakage of the swash plate cam 110 because the swash plate cam 110 has brought the pawl 102 into meshing engagement with the ratchet wheel 106.

In this case, the pressure control valve 84 is provided for the pressure chamber 74 and the powder chamber 76, whereby the explosive pressure of the powder is adequately adjusted so as not to exceed the predetermined value, so that the windup force for the webbing can avoid being excessively great beyond necessity, thus eliminating damages which would otherwise be caused to the occupant by the webbing thus wound up.

In addition, in an emergency of the vehicle, the pendulum 50 senses the acceleration of the vehicle to be tilted, whereby the pawl 48 comes into meshing engagement with the ratchet wheels of the disks 34 and 38 to stop the webbing windout rotation of the winding drum 42 and the webbing, which has been closely attached to the occupant, is not wound out, so that the occupant can be positively restrained by the webbing, thereby ensuring the safety of the occupant.

Figure 8:
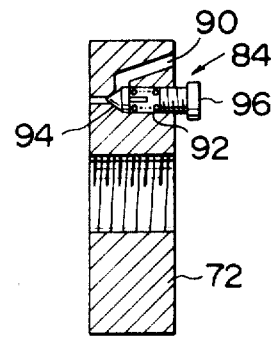
FIG. 8 is a sectional view showing the piston used in a second embodiment of the present invention.

FIG. 8 shows the piston 72 used in a second embodiment of the present invention, to which the pressure control valve 84 is secured. This pressure control valve 84 is similar in construction to the one shown in the preceding embodiment. However, in this case, the pressure control valve is provided in the piston, whereby, when the pressure in the pressure chamber is raised to an excessively high value, such a high pressure is released to atmosphere from the piston 72, so that the pressure in the pressure chamber can be reliably maintained at a predetermined value.

As has been described hereinabove, the seatbelt retractor according to the present invention is of such an arrangement that the explosive pressure of the powder for driving the takeup shaft is restricted to a predetermined value by the pressure control valve, and hence, can offer such an outstanding advantage that, during an emergency, the occupant can be safely and positively restrained.

What is claimed is:

1. A seatbelt retractor for use in a seatbelt system for protecting an occupant in an emergency of a vehicle, comprising:
   (a) a frame secured to a vehicle body;
   (b) a takeup shaft pivotally supported on said frame for winding up an occupant restraining webbing, said takeup shaft being provided on the inner periphery thereof with a ratchet wheel;
   (c) a drum pivotally supported on said frame and rotatable by expansion of a pressure chamber provided therein;
   (d) a clutch mechanism for imparting a turning force of said drum, when said drum rotates, to said takeup shaft as a webbing windup turning force;
   (e) a powder unit provided in communication with said pressure chamber of the drum for imparting an explosive pressure to said pressure chamber to rotate said drum in an emergency of the vehicle, said powder unit secured to and in a position facing said powder chamber;
   (f) a control valve provided in communication with said pressure chamber of the drum for releasing a high pressure to atmosphere when the pressure in the pressure chamber exceeds a predetermined value, whereby the pressure in the pressure chamber is maintained to less than the predetermined value to restrict a webbing takeup force of said takeup shaft to be applied to the occupant;
   (g) a drum support shaft solidly secured to the frame;
   (h) a powder chamber provided in said drum support shaft, a through-hole extending through a core portion of the drum support shaft constituting said powder chamber, said powder chamber communicating with said pressure chamber.

2. A seatbelt retractor as set forth in claim 1, wherein said pressure chamber is formed between said drum support shaft and a piston threadably coupled to the outer periphery of said drum support shaft, and said piston imparts a turning force thereof to said drum while rotating and moving in the direction of the drum support shaft under the pressure in the pressure chamber.

3. A seatbelt retractor as set forth in either of claims 1 or 2, wherein said control valve is secured to one end of said through-hole.

4. A seatbelt retractor as set forth in either of claims 1 or 2, wherein said control valve is formed on the outer periphery thereof with threads, the valve body is brought into abutting contact with the intermediate portion of a vent hole communicated with the pressure chamber by a biasing force, whereby said valve body is moved against said biasing force under a high pressure, so that the pressure chamber can be communicated with atmosphere.

5. A seatbelt retractor as set forth in claim 4, wherein said control valve is threadably coupled into a vent hole extending through the drum support shaft and intercommunicating the pressure chamber with atmosphere.

6. A seatbelt retractor as set forth in claim 2, wherein said control valve is provided in a vent hole extending through said piston.

7. A seatbelt retractor as set forth in claim 2, wherein said drum is provided in a core portion of the takeup shaft and said clutch mechanism is interposed between said drum and the takeup shaft.

8. A seatbelt retractor for use in a seatbelt system for restraining and protecting an occupant by means of a webbing fastened to the occupant in an emergency of a vehicle, for winding up an end of said webbing, comprising:
   (a) a frame secured to a vehicle body;
   (b) a pair of legs extended from opposite sides of said frame in parallel to each other;
   (c) a webbing takeup shaft pivotally supported on said legs;
   (d) a drum support shaft solidly secured to said legs and disposed in a core portion of the takeup shaft, said drum support shaft being penetratingly provided in a core portion thereof with a powder chamber;
   (e) a piston threadably coupled onto the outer periphery of said drum support shaft;
   (f) a drum disposed within said webbing takeup shaft and outwardly of the drum support shaft, said drum forming a pressure chamber communicated with said powder chamber between the drum support shaft and the piston and adapted to receive a turning force from said piston when said piston moves under a pressure from the pressure chamber;
   (g) a pawl provided on the outer periphery of said drum and coming into meshing engagement with a ratchet wheel formed on the inner periphery of the takeup shaft to rotate the takeup shaft in the direction of winding the webbing up when the drum rotates; and
   (h) a pressure control valve secured to said drum support shaft for releasing a pressure in the powder chamber to atmosphere when the pressure exceeds a predetermined value, whereby the pressure in the powder chamber and the pressure chamber is prevented from exceeding the predetermined value, so that generation of an excessively high takeup force in the webbing takeup shaft can be avoided in an emergency of the vehicle.

* * * * *